United States Patent
Kumagai et al.

(10) Patent No.: US 6,250,600 B1
(45) Date of Patent: Jun. 26, 2001

(54) BELLOWS-TYPE PRESSURE RESPONSIVE VALVE

(75) Inventors: Kiyoshi Kumagai; Ichiro Ohkawara; Tomoo Okada, all of Saitama; Shigeyuki Hidaka, Aichi, all of (JP)

(73) Assignees: Kabushiki Kaisha Saginomiya Seisakusho; Kabushiki Kaisha Toyoda Jidoshokki Seisakusho, both of (JP)

(*) Notice: Subject to any disclaimer, the term of this patent is extended or adjusted under 35 U.S.C. 154(b) by 0 days.

(21) Appl. No.: 09/554,256
(22) PCT Filed: Sep. 25, 1999
(86) PCT No.: PCT/JP99/04577
§ 371 Date: May 11, 2000
§ 102(e) Date: May 11, 2000
(87) PCT Pub. No.: WO00/15990
PCT Pub. Date: Mar. 23, 2000

(30) Foreign Application Priority Data

Sep. 16, 1998 (JP) .................................. 10-261474

(51) Int. Cl.[7] ................................................ F16K 31/165
(52) U.S. Cl. ...................................... 251/61.3; 251/335.3
(58) Field of Search ........................ 251/61, 61.1, 61.2, 251/61.3, 335.3

(56) References Cited

U.S. PATENT DOCUMENTS

| | | | |
|---|---|---|---|
| 4,185,772 | * | 1/1980 | Brakebill ................................ 236/86 |
| 4,428,718 | | 1/1984 | Skinner . |
| 4,527,580 | * | 7/1985 | Chheda ..................................... 137/1 |
| 4,911,412 | * | 3/1990 | Danko ................................. 251/335.3 |
| 5,394,900 | * | 3/1995 | Okuyama et al. ................... 137/510 |

FOREIGN PATENT DOCUMENTS

| | | |
|---|---|---|
| 58-158382 | 9/1983 | (JP) . |
| 58-181072 | 12/1983 | (JP) . |
| 59-13175 | 1/1984 | (JP) . |
| 5-52908 U | 7/1993 | (JP) . |

* cited by examiner

Primary Examiner—Kevin Shaver
Assistant Examiner—D. Austin Bonderer
(74) Attorney, Agent, or Firm—Baker & Daniels

(57) ABSTRACT

A bellows-type pressure responsive valve comprising bellows 66 of a closed structure as a pressure sensing element adapted to vary an opening amount of the valve by transmitting expansions and contractions of the bellows 66 to a valve body 61 by means of a valve rod 65 which is supported on a valve housing 51 so as to move in a valve lifting direction, characterized in that the bellows 66 and the valve rod 65 are spherically connected by means of a spherical coupling structure which is incorporated at a connecting portion of the bellows 66 and the valve rod 65 and composed of a ball 77 which is rotatably disposed coaxially with the valve rod 65, and a spherical recess 78 which is formed at a closed end face 67a of a bellows body 67 of the bellows 66 at a central position thereof.

With this structure, centripetal motions of the bellows and the valve rod are automatically effected by means of the spherical coupling between the bellows and the valve rod. Therefore, even though the bellows is weaving or inclined, the unsymmetrical abutment between the bellows and the valve rod can be avoided. Further, forces based on the weaving of the bellows in directions intersecting the valve lifting direction, that is, other directions than the valve lifting direction will be absorbed by the spherical movement of the first spherical coupling structure. Thus, the forces in the other directions than the valve lifting direction will not be transmitted to the valve rod, the hysteresis in the valve motions will be minimized, and a high controlling accuracy can be obtained.

4 Claims, 2 Drawing Sheets

BELLOWS-TYPE PRESSURE RESPONSIVE VALVE

TECHNICAL FIELD

The present invention relates to a bellows-type pressure responsive valve, and more particularly to the bellows-type pressure responsive valve for use as a displacement control valve which is provided in a variable displacement compressor.

BACKGROUND OF THE INVENTION

Use of the bellows-type pressure responsive valve as a displacement control valve to be provided in a variable displacement compressor is disclosed in Japanese Publication No. 58-158382 of an unexamined Patent Application and Japanese Publication No. 5-52908 of an unexamined Utility Model Application.

The bellows-type pressure responsive valve comprises a bellows of a closed structure as a pressure sensing element, and is so constructed that expansions and contractions of the bellows are transmitted to a valve body by way of a valve rod which is supported on a valve housing so as to move in a valve lifting direction, to vary an opening amount of the valve. The bellows-type pressure responsive valve has such advantages as it is more compact and can take longer pressure responsive stroke than the diaphragm-type pressure responsive valve.

However, the bellows is generally difficult to be mounted in a straight line for structural and manufacturing reasons. In case where the bellows is weaving in the valve lifting direction, a lateral force is generated when expansions and contractions of the bellows take place in the valve lifting direction and transmitted to the valve rod, which incurs an increase of hysteresis, etc. in valve motions, resulting in a poor controlling performance and deterioration of accuracy of the valve motions.

In the above described Japanese Publication No. 5-52908 of the unexamined Utility Model Application, there is proposed an art that an end of the bellows and the valve rod are connected in a laterally slidable relation so as to absorb an axial displacement between axes of the bellows and the valve body by their mutual lateral slide. In this art, even though an axis of the bellows is offset from a center of a valve seat, an axis of the valve body is brought in alignment with the center of the valve seat.

However, in this art, only the offset of the axes in a lateral direction between the end of the bellows and the valve body can be compensated. When the bellows is weaving or inclined, the end of the bellows and the valve body come in an unsymmetrical abutment to cause unstable valve motions. Accordingly, the hysteresis in the valve motions cannot be refrained from increasing, but rather increases by loose motion of the end of the bellows in the laterally sliding portions.

DISCLOSURE OF THE INVENTION

This invention has been made in order to solve the above described problems, and an object of the invention is to provide a bellows-type pressure responsive valve which has a least hysteresis in valve motions and high accuracy, even in case where the bellows is weaving, inclined, or defective in its straightness.

In order to achieve the above described object, there is provided, according to an invention of claim 1, a bellows-type pressure responsive valve comprising a bellows of a closed structure as a pressure sensing element adapted to vary an opening amount of the valve by transmitting expansions and contractions of the bellows to a valve body by means of a valve rod which is supported on a valve housing so as to move in a valve lifting direction, characterized in that a first spherical coupling structure is incorporated at a connecting portion of the bellows and the valve rod, whereby the bellows and the valve rod are spherically connected by means of the first spherical coupling structure.

BEST MODE FOR CARRYING OUT THE INVENTION

Now, referring to the attached drawings, an embodiment of this invention will be described in detail.

Figure 1:
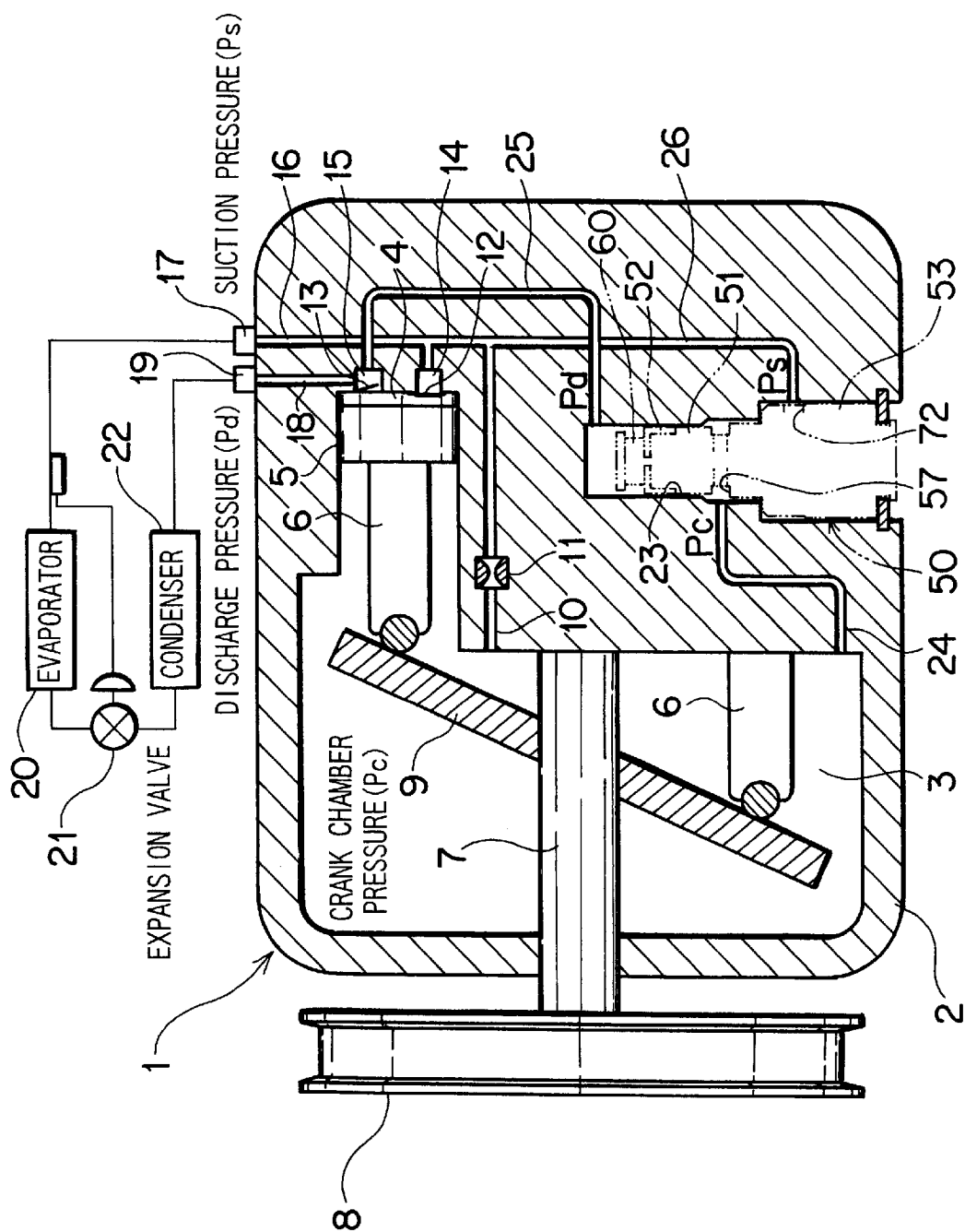
FIG. 1 is a sectional view of a variable displacement compressor of a swash plate type in which a bellows-type pressure responsive valve is incorporated as a displacement control valve showing an example of application of the bellows-type pressure responsive valve according to the present invention.

FIG. 1 shows a variable displacement compressor of a swash plate type in which a bellows-type pressure responsive valve is incorporated as a displacement control valve as an example of application of the bellows-type pressure responsive valve according to the invention.

The variable displacement compressor 1 of a swash plate type has a crank chamber 3 defined by a compressor housing 2, and a plurality of cylinder bores 4 which communicate with the crank chamber 3 at their respective stroke end portions. In each of the cylinder bores 4 is engaged a piston 5 axially slidably. A piston rod 6 is connected at its one end to the piston 5 at a side of the crank chamber 3.

The compressor housing 2 rotatably supports a driving shaft 7 which is connected to an engine (not shown) by means of a driving belt (not shown) wound around a pulley 8 so as to be driven by the engine.

To the driving shaft 7 is connected a wobble plate (a swash plate) 9 by means of a known linking mechanism at variable fitting angles so that a torque can be transmitted. The piston rod 6 is engaged with a face of the wobble plate 9 at a side of the cylinder bore 4 so that an axial force can be transmitted.

In the swash plate type variable displacement compressor 1, the wobble plate 9 is rotated by the driving shaft 7 in a slanted state, and the piston 5 in each of the cylinder bores 4 moves to and fro with a stroke according to an inclined angle of the wobble plate 9. Inclination of the angle is automatically adjusted in proportion to a differential pressure between a pressure Pc in the crank chamber 3 and a suction pressure Ps (suction pressure of the compressor) in the cylinder bore 4.

In this case, the compressor 1 reduces its displacement according to a decrease of strokes of the piston 5 as the inclination of the wobble plate 9 decreases with a rise of the pressure Pc in the crank chamber 3. To the contrary, the displacement increases according to an increase of the strokes of the piston 5, as the inclination of the wobble plate 9 increases with a release of the pressure Pc in the crank chamber 3. When the crank chamber pressure Pc becomes substantially equal to the suction pressure Ps, the compressor is put in a full load operation condition.

The crank chamber pressure Pc is determined by an introduced amount of a discharge pressure Pd by means of a displacement control valve hereinafter described, an amount of a blow by gas at a compression stroke, and a throttled amount by means of an orifice 11 provided in a release passage 10 which is connected to an area of the suction pressure Ps.

Each of the cylinder bores 4 in the compressor housing 2 has a suction port 14 and a discharge port 15 respectively provided with a suction valve 12 and a discharge valve 13 which are one way valves. The suction port 14 is connected to a suction connecting port 17 through a suction passage 16, while the discharge port 15 is connected to a discharge connecting port 19 through a discharge passage 18. A circulating pipe line for freezing cycle including an evaporator 20, an expansion valve 21 and a condenser 22 is connected to the suction connecting port 17 and the discharge connecting port 19.

There is formed, in the compressor housing 2, a bore 23 into which the bellows-type pressure responsive valve 50 as the displacement control valve is adapted to be inserted and fixed.

Figure 2:
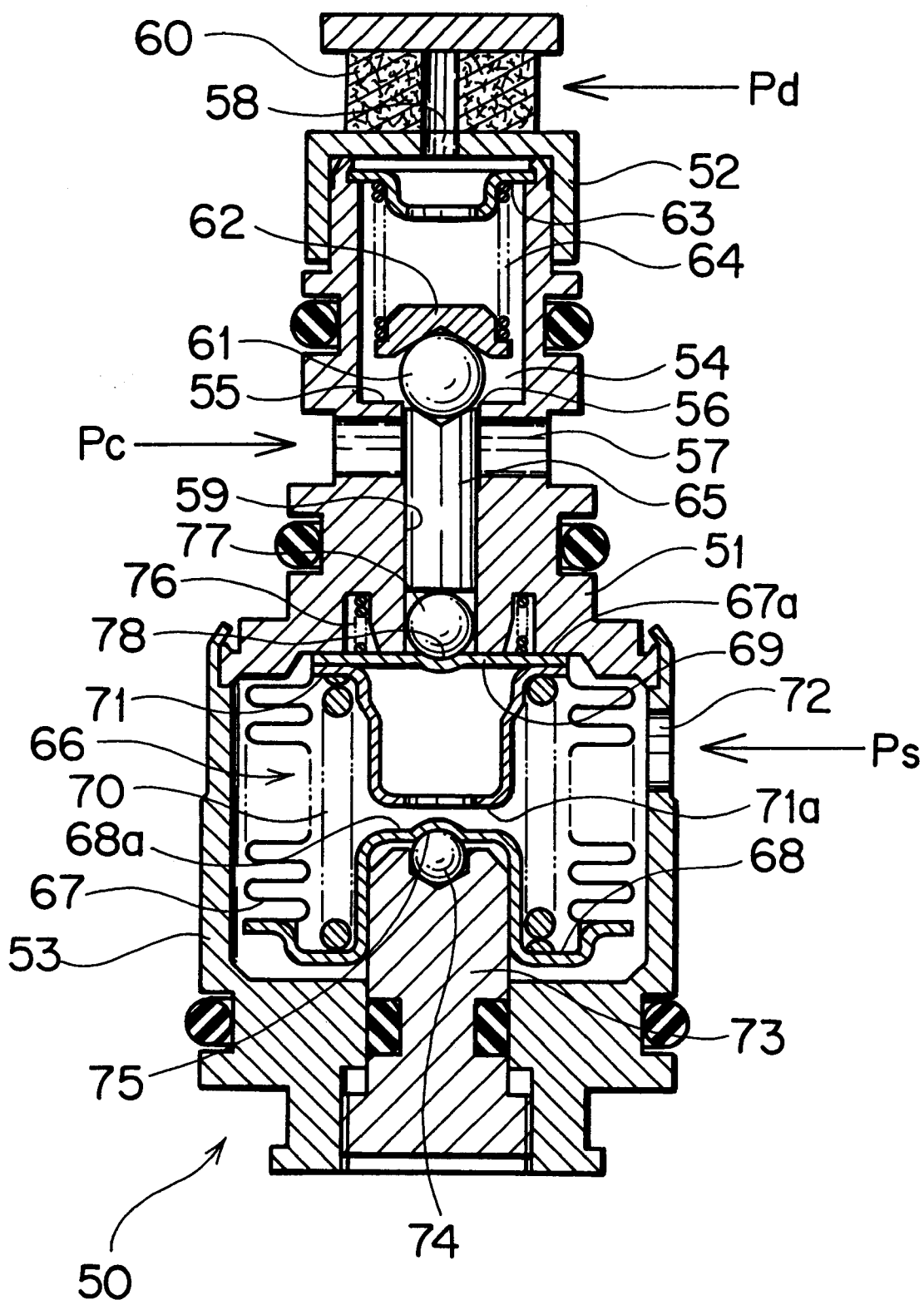
FIG. 2 is a cross sectional view of one embodiment of the bellows-type pressure responsive valve according to the present invention.

Referring now to FIG. 2, the bellows-type pressure responsive valve 50 will be described. FIG. 2 shows a fully opened state.

The bellows-type pressure responsive valve 50 has a valve housing 51, an end cap 52 attached to one end of the valve housing 51, and a bellows case 53 caulked to the other end of the valve housing 51.

An assembly of the valve housing 51 and the end cap 52 includes a valve chamber 54, a valve port 56 defined by a valve seat 55, a first port 57 formed at one side of the valve port 56, a second port 58 formed at the other side of the valve port 56 interposing the valve chamber 54, and a valve rod holding bore 59. A filter 60 for the second port 58 is attached to the end cap 52.

Inside the valve chamber 54, is provided a ball valve (a valve body) 61. Motion of the ball valve 61 in a vertical direction in FIG. 2 (a valve lifting direction) vary a distance between the ball valve 61 and the valve seat 55 and determine the opening degree of the valve.

Between a ball receiving member 62 and a spring receiving seat 63 in the valve chamber 54, is provided a helical compression spring 64 which usually biases the ball valve 61 in a valve opening direction.

The valve rod holding bore 59 is formed in a valve housing 51 below the ball valve 61 in an opposite side to the helical compression spring 64 concentrically with the valve seat 55. A valve rod 65 in a shape of a round rod is inserted in the valve rod holding bore 59 so as to move in the valve lifting direction, that is, an axial direction of the valve rod holding bore 59. The valve rod 65 is abutted against the ball valve 61 at its one end to force the ball valve 61 to open against a spring force of the helical compression spring 64.

Bellows 66 of a closed structure is disposed in the bellows case 53. The bellows 66 is under vacuum inside and consists of a bellows body 67, and end plates 68, 69 closing open ends of the bellows body 67.

Inside the bellows body 67, a helical compression spring 70 is provided between the end plates 68, 69 so as to bias the bellows 66 in an expanding direction. The end plate 69 in the bellows body 67 is provided with a strap member 71 for receiving one end of the helical compression spring 70, while the end plate 68 is formed with a stopper face 68a projecting toward the end plate 69. The maximum contraction amount of the bellows 66 is defined by an abutment of a stopper face 71a of the strap member 71 against the stopper face 68a of the end plate 68.

A port 72 is formed in the bellows case 53. The bellows 66 is so adapted to expand and contract in response to a differential pressure between a pressure introduced into the bellows case 53 through the port 72 and an internal pressure of the bellows.

An adjusting screw 73 is screwed into the bellows case 53. The adjusting screw 73 holds one end of the bellows 66 by means of a second spherical coupling structure consisting of a ball 74 disposed at an axial center of the adjusting screw 73 and a spherical recess 75 formed at an axial center of the end plate 68 (a center of the bellows). In other words, the bellows 66 and the valve housing 51 are spherically connected by means of the second spherical coupling structure through the adjusting screw 73 and the bellows case 53.

The bellows 66 is biased toward the second spherical coupling structure by means of a helical compression spring 76 interposed between the valve housing 51 and a closed end face 67a (an end portion of the bellows in the claims) of the bellows body 67, thereby to keep a spherical contact between the ball 74 and the spherical recess 75.

In a connecting portion between the bellows 66 and the valve rod 65 at a side of the closed end face 67a, is incorporated a first spherical coupling structure consisting of a ball 77 which is inserted into the valve rod holding bore 59 so as to rotate coaxially with the valve rod 65, and a spherical recess 78 which is formed in the center of the closed end face 67a of the bellows body 67. The bellows 66 and the valve rod 65 are thus spherically connected by means of the first spherical coupling structure.

The expansions and contractions of the bellows 66 are transmitted to the valve rod 65 and the ball valve 61 by means of the first spherical coupling structure consisting of the ball 77 and the spherical recess 78.

In a state where the bellows-type pressure responsive valve 50 having the above described structure is incorporated in the swash plate type variable displacement compressor 1 as shown in FIG. 1, the first port 57 communicates with the crank chamber 3 through the passage 24 in the compressor housing 2, and the second port 58 communicates with the discharge port 15 through the passage 25 in the compressor housing 2. The suction pressure Ps is introduced to the port 72 through a passage 26 in the compressor housing 2. The valve operates in response to the differential pressure between the suction pressure Ps and the internal pressure of the bellows thereby to adjust the degree of communication between the discharge port 15 and the crank chamber 3.

Accordingly, in the bellows-type pressure responsive valve 50 incorporated in the swash plate type variable displacement compressor 1, when a spring force of the helical compression spring 70 in the bellows body 67 overwhelms the suction pressure Ps introduced through the passage 26 in the compressor housing 2, the ball 77 is pushed toward the end cap 52 by means of the end plate 69 of the expanded bellows 66.

Then, the valve rod 65 pushed by this ball 77 pushes the ball valve 61 toward the end cap 52 against a spring force of the helical compression spring 64 to move the valve 61 apart from the valve port 56, thereby allowing the bellows-type pressure responsive valve 50 to be opened.

With such the first spherical coupling structure as described above, the center of the closed end face 67a is automatically centripetalized with the axis of the valve rod 65 by means of the spherical coupling between the bellows 66 and the valve rod 65 including the ball 77 and the spherical recess 78. Therefore, even though the bellows 66 is weaving or inclined, the unsymmetrical abutment between the bellows 66 and the valve rod 65 can be avoided.

Further, when lateral forces occur due to the weaving of the bellows 66, the forces in directions intersecting the valve lifting direction, that is, other directions than the valve lifting direction will be absorbed by the spherical movement of the first spherical coupling structure including the ball 77 and the spherical recess 78. Thus, the lateral forces will not be exerted on the valve rod 65.

Particularly because the ball 77 is rotatable, at the spherical movement of the above described first spherical coupling structure by the forces in the other directions than the valve lifting direction due to the centripetal motions of the bellows 66 and the valve rod 65 and the weaving of the bellows 66, the ball 77 will rotate to reliably effect the spherical movement with less resistance.

From the above described structure, even in case where the bellows 66 is weaving, inclined or somewhat poor in its straightness, the forces in the other directions than the valve lifting direction will not be transmitted to the valve rod 65. Thus, the hysteresis in the valve motions will be minimized, and a high controlling accuracy can be obtained.

Further, use of the ball 77 which is widely employed and advantageous in price, precision, size, etc., the bellows-type pressure responsive valve of high precision can be obtained at a low cost.

Moreover, the bellows 66 and the adjusting screw 73 are spherically connected by means of the second spherical coupling structure including the ball 74 and the spherical recess 75. Therefore, even though the bellows 66 is inclined at the connected portion with the adjusting screw 73 in the valve housing 51, no irregular force will be applied to the connected portion. This will not hinder but rather expedite the centripetal action of the first spherical coupling structure including the ball 77 and the spherical recess 78, and at the same time, increase durability of the bellows 66.

INDUSTRIAL APPLICABILITY

As apparent from the foregoing description of the embodiment, with the bellows-type pressure responsive valve according to the invention, the centripetal motions of the bellows and the valve rod 65 are automatically effected by means of the spherical coupling between the bellows and the valve rod. Therefore, even though the bellows is weaving or inclined, the unsymmetrical abutment between the bellows and the valve rod can be avoided. Further, the forces based on the weaving of the bellows in directions intersecting the valve lifting direction, that is, other directions than the valve lifting direction will be absorbed by the spherical movement of the first spherical coupling structure. Thus, the forces in the other directions than the valve lifting direction will not be transmitted to the valve rod, the hysteresis in the valve motions will be minimized, and a high controlling accuracy can be obtained.

Further, according to the bellows-type pressure responsive valve of the invention, by constructing the first spherical coupling structure so as to include the ball coaxially arranged with the valve rod and the spherical recess formed at the end portion of the bellows at the central position thereof, at the spherical movement of the first spherical coupling structure by the forces in the other directions than the valve lifting direction due to the spherical movement of the first spherical coupling structure for centripetal motions of the bellows and the valve rod or the weaving of the bellows, the ball rotates to reliably effect the spherical movements with less resistance. The forces in the other directions than the valve lifting direction will not be transmitted to the valve rod. Thus, the hysteresis in the valve motions will be minimized, and a high controlling accuracy can be obtained.

Still further, according to the bellows-type pressure responsive valve of the invention, there is incorporated a second spherical coupling structure at the connecting portion of the bellows and the valve housing at the opposite side to the connecting portion of the bellows and the valve rod, whereby the bellows and the housing are spherically connected by means of the second spherical coupling structure. In this manner, the bellows and the housing are spherically connected by the second spherical coupling structure, and even though the bellows is inclined at the connected portion with the housing, no irregular force will be applied to the connected portion, and durability of the bellows can be assured.

What is claimed is:

1. A bellows-type pressure responsive valve comprising a bellows of closed structure as a pressure sensing element adapted to vary an opening amount of said valve by transmitting expansions and contractions of said bellows to a valve body by means of a valve rod which is supported on a valve housing so as to move in a valve lifting direction, characterized in that a first spherical coupling structure is incorporated at a connecting portion of said bellows and said valve rod, whereby said bellows and said valve rod are spherically connected by means of said first spherical coupling structure.

2. The bellows-type pressure responsive valve according to claim 1, characterized in that said first spherical coupling structure is composed of a ball which is rotatably disposed coaxially with said valve rod, and a spherical recess which is formed at an end portion of said bellows at a central position thereof.

3. The bellows-type pressure responsive valve according to claim 1, characterized in that it further comprises a second spherical coupling structure incorporated at a connecting portion of said bellows and said valve housing an opposite side to said connecting portion of said bellows and said valve rod interposing said bellows, whereby said bellows and said housing are spherically connected by means of said second spherical coupling structure.

4. The bellows-type pressure responsive valve according to claim 2, characterized in that it further comprises a second spherical coupling structure incorporated at a connecting portion of said bellows and said valve housing an opposite side to said connecting portion of said bellows and said valve rod interposing said bellows, whereby said bellows and said housing are spherically connected by means of said second spherical coupling structure.

* * * * *

UNITED STATES PATENT AND TRADEMARK OFFICE
CERTIFICATE OF CORRECTION

PATENT NO.    : 6,250,600 B1
DATED         : June 26, 2001
INVENTOR(S)   : Kiyoshi Kumagai et al.

It is certified that error appears in the above-identified patent and that said Letters Patent is hereby corrected as shown below:

<u>Title page,</u>
Item [22], the PCT Filing date should read -- August 25, 1999 --.

Signed and Sealed this

Fifth Day of February, 2002

Attest:

JAMES E. ROGAN
*Attesting Officer*    *Director of the United States Patent and Trademark Office*